Patented Mar. 3, 1942

2,274,905

UNITED STATES PATENT OFFICE 2,274,905

METHOD FOR DEHYDRATION AND CURING OF VEGETABLE MATERIALS

Lawrence W. Lewis, Beverly Hills, Calif.

No Drawing. Application June 22, 1939,
Serial No. 280,552

8 Claims. (Cl. 99—8)

This invention relates to curing or preserving vegetable food materials and in particular to treating hay and fodder materials to preserve the nutrient values therein.

The object of the invention is to provide a process for treating juice-containing vegetable materials which is expeditious, cheaper, and more effective in curing and in preserving the optimum nutrient values than results from the processes now in use, and the products resulting from this process of treatment.

I have discovered that hay, fodders, and juicy vegetable materials and feeds may be cured and preserved by adding thereto quicklime, preferably after maceration of the material to liberate liquids by which the reactions are more readily and rapidly started.

My process may be illustrated by reference to the curing of alfalfa hay. It is now customary to cut this crop and leave it on the ground subjected to natural atmospheric drying and sunlight. The removal of water is sometimes accomplished by means of artificial external heating. When hay containing too much moisture is piled or stored, the nutrient values are materially decreased by bacterial action, molds, and heat. If the cut hay is left in the sun for any length of time, the nutrient factors including certain vitamins are destroyed or decreased. Due to the natural diversity of atmospheric conditions, the process of natural curing is irregular and uncertain, and the resulting products vary in appearance and nutrient values over a wide range.

In my process, I treat the freshly cut hay with quicklime. I prefer to first macerate the material slightly to break up some of the liquid-containing cells of the plant structure. This maceration is not necessary, but the reaction starts more readily in the presence of free moisture from the plant juices. The amount of quicklime to be used depends upon how much moisture is to be removed or bound up in producing a satisfactorily cured product. For example, in freshly cut alfalfa, containing about 75 percent water, I add, after slight maceration of the stalks and leaves, about 5 parts of quicklime to 100 parts of alfalfa solids, sifting the powdered quicklime over the macerated material. The mixture is allowed to stand, with or without further stirring. The reaction between the moisture of the alfalfa and the quicklime is rapid, resulting in some heating, which vaporizes part of the water. A portion of the remainder of the water content is bound up with the quicklime, and some remains in the vegetable structure after curing.

By this process the nutrient factors naturally occurring in the material are fixed and preserved, so that the cured material has almost as great nutrient value as the fresh hay material. The local heat generated by the reaction of the quicklime and the juices, and the high alkalinity produced by the quicklime inhibits or substantially stops bacterial and mold action and stabilizes the nutrient factors including the vitamins and pigments. The green color of the fresh growing plant is substantially retained.

By the use of my process, the loss of leaves, for example as in alfalfa hay, which sometimes amounts to as much as 10 to 15 per cent by the older methods of processing, is almost wholly eliminated.

The quantity of quicklime to be used depends upon many conditions, including juice content, extraneous water, atmospheric conditions, etc., and upon the degree of dehydration and curing to be attained. Roughly, one part of lime to 100 parts vegetable solids will reduce the free or liquid moisture by about 15 percent. An excess of quicklime is not harmful for many purposes, and may be intentionally used, the excess being sifted out or blown out after the drying and curing action is completed, and then the lime may be reused with untreated material.

The products of reaction of the juices and the quicklime are complex calcium compounds which have been found to be beneficial in feed materials. Upon exposure to the atmosphere, any free quicklime and the hydrated lime are converted to calcium carbonate, which, in feeds, is harmless.

All hay and fodder crops such as grasses, legumes, alfalfa, clover, green grains, timothy, kaffir, and the like may be cured by this process, and other juice-containing vegetable material including leaves, stalks, fruit and roots, and also vegetable waste and residues both raw and cooked may be dehydrated and preserved for feeds or other purposes. For example, bagasse and sugar beet pulp, after extraction of the sugars in the usual process, are subject to rapid spoiling. By my process, these by-products may be treated with 5 to 10 parts of quicklime to 100 parts vegetable and after a few minutes reacting time, in which moisture is removed by evaporation from the heat generated by the hydration of the quicklime, the material may be stored in bulk or in containers, and used as a substantially dry and cured feed product. Garbage material, either before or after mechanical reduction of the water content may also be stabilized and the deterioration by bacterial activity arrested, by treatment with quicklime in amount sufficient to produce a substantially dry product.

In carrying out my process, especially as applied to hay and fodder, I prefer to treat the plant material soon after it is cut in the field, because by so doing the action of the bacteria and spores is quickly retarded before their number has been allowed to greatly increase, as they will if the hay is allowed to remain untreated. In addition, the quick removal of the cut hay etc. from direct exposure to sunlight, and the action of rain and high humidity, prevents deterioration of those nutrient factors which are effected adversely by these conditions. My process, however, may be applied to partially dried vegetable materials, or the product of my process, with or without preliminary dehydration, may be further dried or processed under artificial heat.

The advantages of my process will be apparent to those familiar with this art. The use of my process permits the almost immediate curing and storage of hay and fodder and the like, irrespective of the weather conditions; it is economical, requires only easily available, simple machinery and chemicals, and does not require accurately controlled operating conditions or proportions for successful use. Its use with vegetable materials other than hay and fodder permits economical preservation of low cost feed materials which now are usually wasted or destroyed.

The cured and partly dehydrated products resulting from the use of my process on juice-containing vegetable materials, as above described, are superior to the present products made from the same vegetable materials by other processes, are more uniform in quality, and they are produced at lower cost. When applied to green hays and fodder, the natural green color is maintained, and the nutrient values are nearly as high as in the natural materials. The reaction products of the quicklime and the vegetable juices, etc. are beneficial in feed products. Feed materials which are now wasted because of unsatisfactory processes of curing are preserved in condition for easy storage and subsequent use.

While I have illustrated my process and products in relation to certain illustrative starting materials, I do not wish to restrict my invention thereby, but limit the scope of this invention only insofar as required by the prior art and the spirit of the appended claims.

I claim:

1. In the process of curing solid juice-containing vegetable feed materials, the step comprising mixing an amount of quicklime with said materials sufficient to dry up perceptible moisture and produce a dry non-spoiling feed.

2. The process of curing solid juice-containing vegetable feed materials, comprising macerating said materials to provide surface liquid, and mixing said macerated material with an amount of quicklime sufficient to dry up perceptible moisture and produce a dry non-spoiling feed.

3. In the process of curing hay and fodder, the step comprising mixing an amount of quicklime with said hay and fodder sufficient to dry up perceptible moisture and produce a dry non-spoiling feed.

4. The process of curing hay and fodder materials comprising macerating said materials to provide surface liquid, and mixing said macerated material with an amount of quicklime sufficient to dry up perceptible moisture and produce a dry non-spoiling feed.

5. The process of dehydrating and curing solid sugar beet materials comprising mixing an amount of quicklime with said materials sufficient to dry up perceptible moisture and produce a dry non-spoiling material.

6. The process of making alfalfa meal comprising macerating the freshly cut alfalfa hay, mixing therewith a small proportion of quicklime sufficient to react with and dry up perceptible moisture, allowing the mixture to stand until the reaction between the quicklime and the alfalfa juice has completed itself, and pulverizing the reacted mixture.

7. The process of curing solid juice-containing vegetable materials comprising macerating said materials to produce surface moisture, mixing therewith a small proportion of quicklime sufficient to react with and dry up perceptible moisture, and allowing the mixture to stand until the reaction between the quicklime and the juice has completed itself.

8. The process of curing solid juice-containing vegetable materials comprising macerating said materials to provide surface juice, mixing therewith an excess of quicklime beyond that required to perceptibly dry and cure the material to preserve it, allowing the mixture to stand until the reaction between juices and quicklime has completed itself, and removing the excess quicklime.

LAWRENCE W. LEWIS.